(12) United States Patent
Yang

(10) Patent No.: US 8,939,197 B2
(45) Date of Patent: Jan. 27, 2015

(54) INSTALLATION ADAPTED WITH TEMPERATURE EQUALIZATION SYSTEM

(76) Inventor: Tai-Her Yang, Dzan-Hwa (TW)

(*) Notice: Subject to any disclaimer, the term of this patent is extended or adjusted under 35 U.S.C. 154(b) by 0 days.

(21) Appl. No.: 13/331,400

(22) Filed: Dec. 20, 2011

(65) Prior Publication Data

US 2012/0111530 A1    May 10, 2012

Related U.S. Application Data

(62) Division of application No. 11/441,096, filed on May 26, 2006, now Pat. No. 8,100,172.

(51) Int. Cl.
*F24J 3/08* (2006.01)
*F28F 27/00* (2006.01)
*F24J 3/06* (2006.01)
*F28D 20/00* (2006.01)

(52) U.S. Cl.
CPC . *F28F 27/00* (2013.01); *F24J 3/06* (2013.01); *F28D 20/0052* (2013.01); *F24J 3/08* (2013.01); *Y02E 60/142* (2013.01)
USPC ............... 165/244; 165/45; 165/50; 165/208; 165/219; 165/240; 165/296; 165/297; 62/260; 237/8 R

(58) Field of Classification Search
USPC ........... 165/45, 119, 11.1, 48.1, 54, 909, 244, 165/247, 97, 104.31, 104.19, 208, 240, 50, 165/296, 297, 219; 454/236; 62/260; 237/8 R
See application file for complete search history.

(56) References Cited

U.S. PATENT DOCUMENTS

| | | | |
|---|---|---|---|
| 2,461,449 A | 2/1949 | Smith et al. |
| 2,513,373 A | 7/1950 | Sporn et al. |
| 2,637,531 A | 5/1953 | Davidson |
| 2,884,764 A | 5/1959 | Siggelin |
| 2,919,114 A | 12/1959 | Ljungström |
| 3,070,965 A | 1/1963 | Anderson et al. |
| 3,520,354 A | 7/1970 | Lawrence |
| 3,648,767 A | 3/1972 | Balch |
| 3,975,912 A | 8/1976 | Greene |
| 4,091,863 A | 5/1978 | Schroder |
| 4,157,730 A | 6/1979 | Despois et al. |
| 4,205,718 A | 6/1980 | Balch |

(Continued)

FOREIGN PATENT DOCUMENTS

| CN | 1538127 A | 10/2004 |
|---|---|---|
| CN | 2720355 Y | 8/2005 |

(Continued)

*Primary Examiner* — John Ford
(74) *Attorney, Agent, or Firm* — Rabin & Berdo, P.C.

(57) ABSTRACT

A temperature equalization system, including an installation, a heat equalizer disposed in a natural heat carrier and being made of a material of heat conduction, a relay heat equalizer, a first fluid transmission duct disposed between the relay heat equalizer and the installation and having a first fluid contained therein for heat transmission, a second fluid transmission duct disposed between the heat equalizer and the relay heat equalizer and having a second fluid contained therein for heat transmission, a pump and a relay pump respectively connected in series with the first and second fluid transmission ducts for pumping the first and second fluid, and a control means controlling the pump to pump the first fluid through the relay heat equalizer, the fluid transmission duct and an interior of the installation, and to pump the second fluid through the relay heat equalizer, the second fluid transmission duct and the heat equalizer.

13 Claims, 4 Drawing Sheets

(56) References Cited

U.S. PATENT DOCUMENTS

| | | | |
|---|---|---|---|
| 4,325,228 A * | 4/1982 | Wolf | 62/260 |
| 4,388,966 A | 6/1983 | Spiegel | |
| 4,448,237 A | 5/1984 | Riley | |
| 4,577,679 A | 3/1986 | Hibshman | |
| 4,699,676 A | 10/1987 | Held | |
| 4,718,478 A * | 1/1988 | Huber | 165/220 |
| 5,031,515 A * | 7/1991 | Niemela et al. | 454/236 |
| 5,178,485 A | 1/1993 | Katsuragi et al. | |
| 5,347,825 A * | 9/1994 | Krist | 62/179 |
| 5,586,449 A * | 12/1996 | Krist | 62/179 |
| 5,651,251 A | 7/1997 | Hardin | |
| 6,129,141 A * | 10/2000 | Yang | 165/45 |
| 6,298,677 B1 | 10/2001 | Bujak, Jr. | |
| 8,100,172 B2 * | 1/2012 | Yang | 165/244 |
| 2004/0000408 A1* | 1/2004 | Mancini et al. | 169/13 |
| 2004/0194909 A1* | 10/2004 | Yang | 165/11.1 |

FOREIGN PATENT DOCUMENTS

| | | |
|---|---|---|
| EP | 666454 A1 | 8/1995 |
| GB | 2275766 A | 9/1994 |

* cited by examiner

INSTALLATION ADAPTED WITH TEMPERATURE EQUALIZATION SYSTEM

CROSS-REFERENCE TO RELATED APPLICATIONS

This application is a Divisional Application of U.S. patent application Ser. No. 11/441,096, filed May 26, 2006, the content of which is hereby incorporated by reference.

BACKGROUND OF THE INVENTION (a) Field of the Invention

The present invention is related to an installation adapted with a temperature equalization system, and more particularly, to one comprised of heat equalizer and fluid transmission duct disposed in a heat carrier existing in solid or liquid state in the nature including stratum, surface of earth, pond, lake, river, desert, iceberg, or ocean where presents comparatively larger and more reliable heat carrying capacity for the heat equalization installation to directly execute the operation of temperature equalization regulating function on the fluid with temperature difference flowing through the installation; or alternatively, an additional relay heat equalizer giving good heat conduction with the active heat equalization installation to provide the operation of temperature equalization regulating function on the fluid with temperature difference flowing through the relay heat equalizer.

(b) Description of the Prior Art

An active temperature equalization device must be provided in conventional equipment for maintaining the temperature, cooling or heating, which enhances cost and consumes more energy.

SUMMARY OF THE INVENTION

The primary purpose of the present invention is to provide an fluid circulating installation adapted with a temperature equalization system and fluid transmission duct disposed in a heat carrier existing in solid or liquid state in the nature where presents comparatively larger and more reliable heat carrying capacity. The fluid passes through the installation to regulate for temperature equalization, and flows back to the heat equalization installation disposed in the natural heat carrier for the heat equalization installation providing good heat conduction in the natural heat carrier to provide the operation of temperature equalization regulating function on the backflow of the fluid.

DETAILED DESCRIPTION OF THE PREFERRED EMBODIMENTS

The present invention is related to an installation adapted with a temperature equalization system by means of a heat carrier in the nature. The heat carrier comes from stratum, surface of earth, pond, lake, river in a solid or liquid state that provides comparatively reliable thermal energy; and a heat equalizer with good thermal conduction performance is disposed in the heat carrier to regulate the fluid with temperature difference passing through the installation for temperature equalization; or the space available in the heat carrier to accommodate fluid or a fluid transmission duct is provided for the fluid to directly contact the heat carrier to function temperature equalization on the fluid passing through.

Based on the environment, benefits and cost considerations, the installation adapted with a heat carrier temperature equalization system may be comprised of the following system configurations:

(1) A system directly provides temperature equalization function by means of a one-way fluid;

(2) A system indirectly provides temperature equalization function by means of a one-way fluid;

(3) A system directly provides temperature equalization function by means of a two-way fluid; and (4) A system indirectly provides temperature equalization function by means of a two-way fluid.

Figure 1:
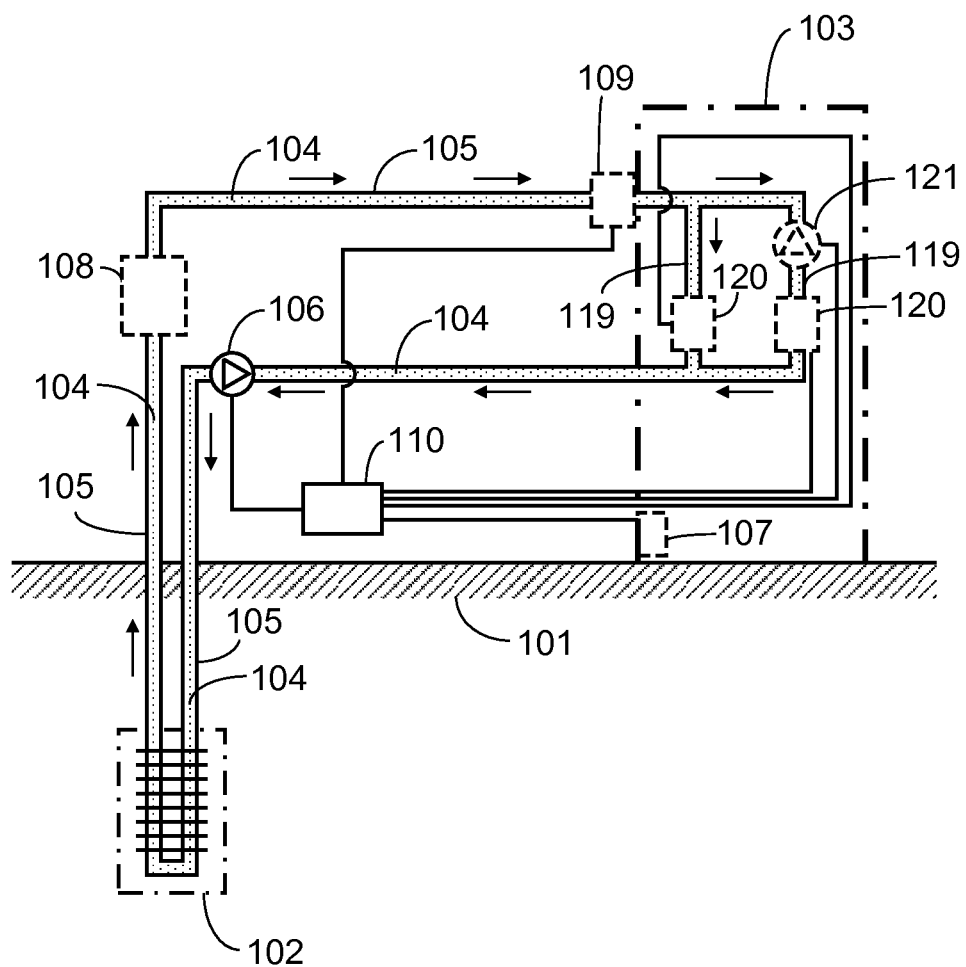
FIG. 1 is a schematic view showing a system of the present invention to directly provide temperature equalization by means of a one-way fluid.
Figure 2:
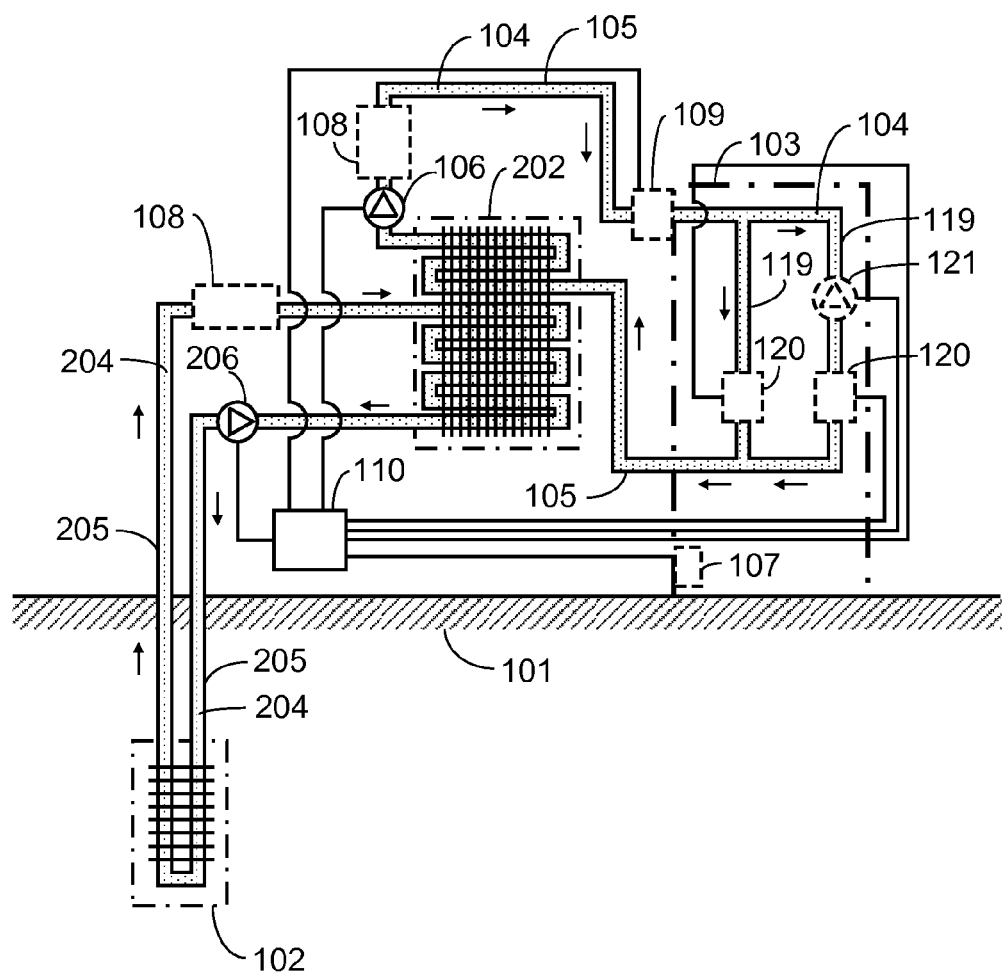
FIG. 2 is a schematic view showing a system of the present invention to indirectly provide temperature equalization by means of a one-way fluid.
Figure 3:
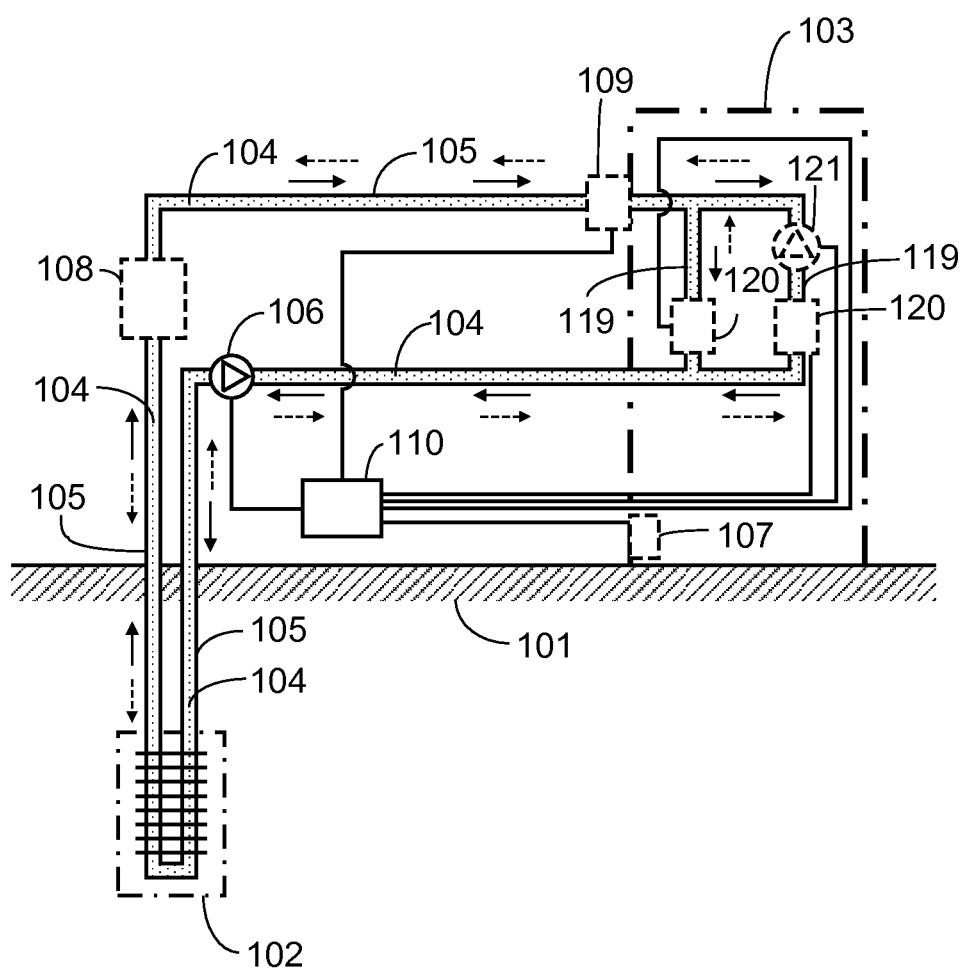
FIG. 3 is a schematic view showing a system of the present invention to directly provide temperature equalization by means of a two-way fluid.
Figure 4:
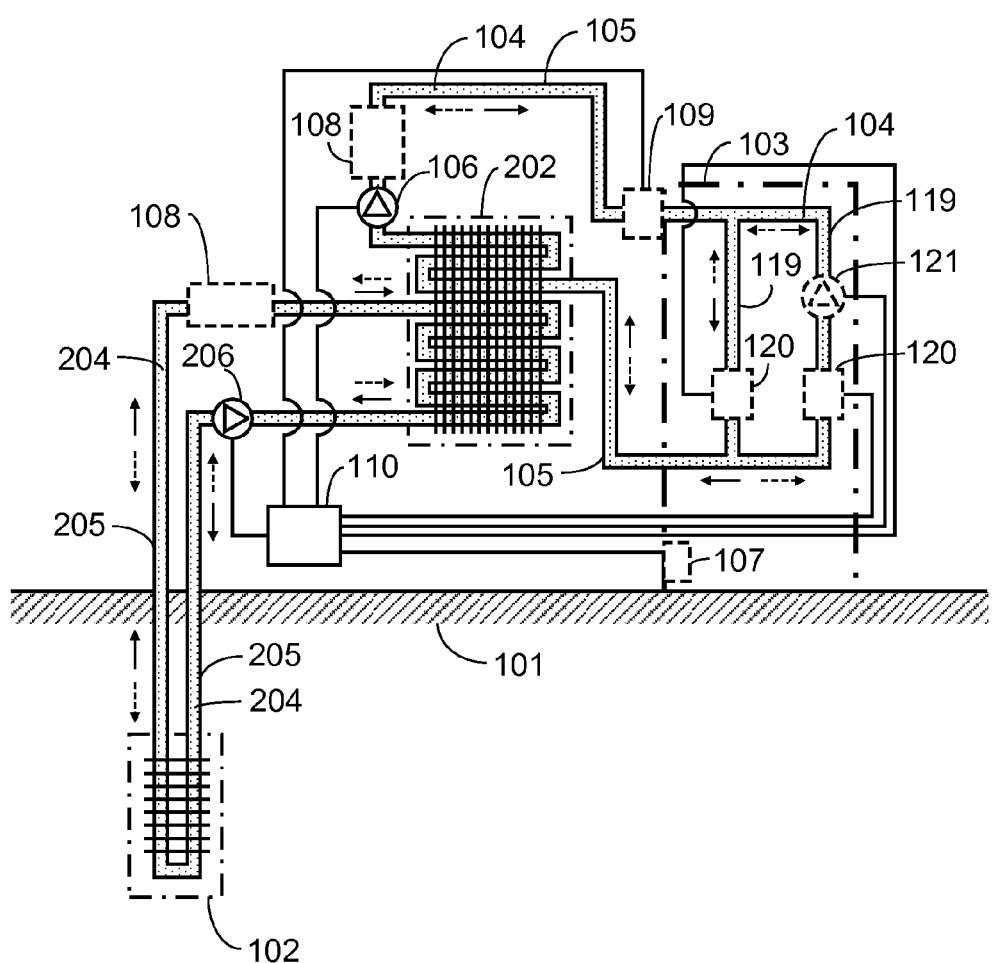
FIG. 4 is a schematic view showing a system of the present invention to indirectly provide temperature equalization by means of a two-way fluid.

As illustrated in FIG. 1 for a schematic view showing a system of the present invention to directly provide temperature equalization by means of a one-way fluid, the system is disposed with one or a plurality of fluid transmission duct 105. A pump 106 is disposed to pump the fluid to pass through an installation 103, the fluid transmission duct 105 and flow back to a heat equalizer 102 disposed in a natural heat carrier 101 to complete a cycle of the fluid. The system is essentially comprised of:

the natural heat carrier 101: relates to one existing in the nature including stratum, surface of earth, pond, lake, river, desert, iceberg, and ocean in solid or liquid state that provides comparatively larger and more reliable heat carrying capacity;

the heat equalizer 102: relates to one made of a material with good heat conduction performance and constructed in a way to provide good heat conduction with the natural heat carrier 101; the heat equalizer 102 is provided with a fluid inlet, a fluid outlet, and an internal fluid passage; or the space in the natural heat carrier 101 allowing the fluid to flow forthwith constitutes a heat carrier for heat accumulation to replace the heat equalizer 102, made of a material with good heat conduction performance; or both of the heat equalizer 102 and the space in the natural heat carrier 101 are provided at the same time;

an installation 103: relates to an industrial installation given specific functions including precision tooling machine, precision industrial machine, precision test/detection instrument, observation instrument that requires stable temperature, or specific open storage tank, closed storage tank, or any other cold storage facilities and power storage device such as UPS battery that must operate in an environment of consistent temperature; or rotary electro-mechanical equipment including engine of an internal combustor, motor, or generator that must be cooled during operation; the installation 103 including any of those installations, facilities, or devices is constructed such that it is prepared to execute the subject matter of temperature equalization; or is adapted with a heat sink for cooling or heating to function as the subject matter of temperature equalization;

Inside the installation 103, a duct is provided for the fluid 104 to pass through, and a construction is provided at where the structure of the subject matter of temperature equalization attempted by the installation 103 to regulate for temperature equalization between the fluid 104 and the installation 103; or the duct allowing circulation of the fluid 104 is forthwith used to directly provide the regulation for temperature equalization by passing the location of the subject matter of temperature equalization regulating desired. Furthermore, optional items including a bypass duct 119, a bypass control valve 120, and a bypass auxiliary pump 121 may be provided as applicable to introduce the fluid 104 from the heat equalizer 102 disposed in the natural heat carrier 101 to regulate for temperature equalization by having the fluid 104 to flow through the selected individual part of the installation 103, and then the fluid 104 flows back to the heat equalizer 102 to complete the circulation for the operation to provide temperature equalization. As illustrated in FIG. 1, first and second fluid bypass ducts 119 may be disposed in parallel in the installation 103 and both in communication with the fluid transmission duct 105. The first and second fluid bypass ducts 119 respectively have first and second bypass control valves 120 connected in series therewith. The second fluid bypass duct 119 has a bypass auxiliary pump 121 connected in series therewith for pumping the fluid 104 flowing therethough;

the fluid 104: relates to a gas or a liquid provided to execute the function of heat transmission in the system; the fluid 104 is pumped by the pump 106 to flow through the heat equalizer 102 disposed in the natural heat carrier 101, the fluid transmission duct 105 the optional bypass duct 119 disposed in the installation 103, and flows back through the fluid transmission duct 105 to the heat equalizer 102 to complete the circulation for the operation to provide temperature equalization;

the fluid transmission duct 105: relates to a duct structure provided at where between the heat equalizer 102 and the installation 103 and connected in series with the pump 106 for the fluid 104 to circulate; to facilitate maintenance, an optional device with structure to open or to draw may be provided to the fluid transmission duct 105 as applicable;

the pump 106: relates to a fluid pump driven by electric power, mechanical force, manpower, or any other natural force, connected in series with the fluid transmission duct 105, and subject to the control by a control unit 110 to pump the fluid 104; this pumping function may be submitted by the convection effects of the temperature fluctuation of the fluid;

a temperature detector device 107: an optional item related to analog or digital dynamo-electric or solid state electronic device of the prior art to indicate the temperature, or provide signal feedback to the control unit 110;

a filter 108: relates to an optional item provided at the fluid suction inlet or outlet of each device mounted to the fluid circulation loop, or at a selected location in the fluid transmission duct 105 to prevent the duct from getting plugged and assurance of clean fluid;

an auxiliary temperature regulation device 109: an optional item related to dynamo-electric solid, gas or liquid state temperature regulation device to heat or cool the fluid 104, or a power heating or cooling device comprised of solid state or semiconductor, provided in the installation adapted with the temperature equalization system of the present invention at where to heat or cool the fluid 104; and as subject to the control by the control unit 110 to be activated to regulate the heating or cooling temperature control to the fluid 104 when the temperature in the device floats away from the range set; and the control unit 110: comprised of dynamo-electric or solid state electronic circuit and related software to control the direction and flow rate of the fluid 104 between the heat equalizer 102 and the installation 103; and to control the pump 106 to pump the fluid 104 for one-way continuous or intermittent pumping;

when the auxiliary temperature regulation device 109, liquid bypass duct 119, bypass control valve 120, and bypass auxiliary pump 121 are optionally provided to the installation 103, the control unit 110 controls the operating timing and temperature setup of the auxiliary temperature regulation device 109, and controls the operation of the bypass control valve 120 and the bypass auxiliary pump 121 to pump or stop pumping the fluid 104 in each bypass duct 119, and controls the flow rate or any other related functions; and the control unit 110 could be setup functions and may be or may not be provided as applicable. FIG. 2 is a schematic view showing a system of the present invention to indirectly provide temperature equalization by means of a one-way fluid. Wherein, an additional relay heat equalizer 202 is provided to indirectly transmit thermal energy for constituting a regulation system of one-way indirect temperature equalization. Other than those items including the natural heat carrier 101, the heat equalizer 102, the installation 103, the fluid 104, the fluid transmission duct 105, the pump 106, the temperature detection device 107, the filter 108, the control unit 110, and those optional items including auxiliary temperature regulation device 109, the bypass duct 119, the bypass control valve 120, and the bypass auxiliary pump 121 as illustrated in FIG. 1, the indirect regulation system of temperature equalization by means of one-way fluid is further comprised of:

the heat equalizer 102 with good heat conduction performance is disposed in the natural heat carrier 101 for both of the heat equalizer 102 and the natural heat carrier 101 to jointly provide the conduction of heat equalization;

the relay heat equalizer 202 is made of a material giving good heat accumulation and heat conduction properties, and provided with a first fluid passage including inlet, flowing passage, and outlet for the fluid 104 and a second fluid passage including inlet, flowing passage, and outlet for another fluid 204; both of the fluid 104 and the fluid 204 transmit thermal energy to each other by means of the relay heat equalizer 202;

a fluid transmission duct 205 and a fluid relay pump 206 are provided at where between the heat equalizer 102 and the relay heat equalizer 202 to continuously or intermittently execute one-way pumping the fluid 204 between the heat equalizer 102 and the relay heat equalizer 202 to form a closed loop flow passage for functioning the regulation of temperature equalization between the heat equalizer 102 and the relay heat equalizer 202;

the fluid transmission duct 105 and the pump 106 are disposed between the installation 103 and the relay heat equalizer 202 to continuously or intermittently execute one-way pumping the fluid 104 between the installation 103 and the relay heat equalizer 202 to provide the function of regulating the temperature equalization;

the fluid transmission duct 105: relates to a duct structure for the fluid 104 to pass through, to facilitate maintenance, an optional device with structure to open or to draw may be provided to the fluid transmission duct 105 as applicable;

the fluid 104: relates to a gas or liquid giving good heat accumulation and heat conduction properties, and is pumped by the pump 106 for the fluid 104 between the relay heat equalizer 202 and the installation 103 to constitute a flow passage through the fluid transmission duct 105 to provide the regulating function of heat equalization; and the fluid 104 may be or may not be identical with the fluid 204 as applicable;

the fluid transmission duct 205: relates to a duct structure for the fluid 204 to pass through, to facilitate maintenance, an optional device with structure to open or to draw may be provided to the fluid transmission duct 205 as applicable;

the fluid 204: relates to a gas or liquid giving good heat accumulation and heat conduction properties, and is pumped by the relay pump 206 for the fluid 204 between the heat equalizer 102 and the relay heat equalizer 202 to constitute a flow passage through the fluid transmission duct 205 to provide the regulating function of heat equalization; and the fluid 204 may be or may not be identical with the fluid 104 as applicable;

the pump 106: relates to a fluid pump driven by electric power or mechanical force to pump the fluid 104; and this pumping function may be submitted by the convection effects of the temperature fluctuation of the fluid;

the relay pump 206: relates to a fluid pump driven by electric power or mechanical force to pump the fluid 204; and this pumping function may be submitted by the convection effects of the temperature fluctuation of the fluid;

the fluid transmission duct 105 and the pump 106 are disposed at where between the installation 103 and the relay heat equalizer 202; and having the pump 106 to pump the fluid 104 flowing between the installation 103 and the relay heat equalizer 202 to provide the function of temperature equalization;

the control unit 110: comprised of dynamo-electric or solid state electronic circuit and related software to control the direction and flow rate of the fluid 104 between the installation 103 and the relay heat equalizer 202 and the direction and flow rate of the fluid 204 between the relay heat equalizer 202 and the heat equalizer 102; and control the pump 106 to pump the fluid 104 or control the relay pump 206 to pump the fluid 204 for one-way continuous or intermittent pumping; and the control operation of the control unit 110 includes:

the pump 106 subject to the control by the control unit 110 executes one-way continuous or intermittent pumping to pump the fluid 104 between the installation 103 and the relay heat equalizer 202 for constituting the control and regulation of one-way temperature equalization; and the relay pump 206 subject to the control by the control unit 110 executes one-way continuous or intermittent pumping to pump the fluid 204 between the heat equalizer 102 and the relay heat equalizer 202 for constituting the control and regulation of one-way temperature equalization; and when the auxiliary temperature regulation device 109, bypass duct 119, bypass control valve 120, and bypass auxiliary pump 121 are optionally provided to the installation 103, the control unit 110 controls the operating timing and temperature setup of the auxiliary temperature regulation device 109, and controls the operation of the bypass control valve 120 and the bypass auxiliary pump 121 to pump or stop pumping the fluid 104 in each bypass duct 119, and controls fluid rate or any other related functions; and the control unit 110 could be setup functions and may be or may not be provided as applicable. FIG. 3 is a schematic view showing a system of the present invention to directly provide temperature equalization by means of a two-way fluid. The system is essentially comprised of:

the natural heat carrier 101: relates to one existing in the nature including stratum, surface of earth, pond, lake, river, desert, iceberg, and ocean in solid or liquid state that provides comparatively larger and more reliable heat carrying capacity;

the heat equalizer 102: relates to one made of a material with good heat conduction performance and constructed in a way to provide good heat conduction with the natural heat carrier 101; the heat equalizer 102 is provided with a fluid inlet, a fluid outlet, and an internal fluid passage; or the space in the natural heat carrier 101 allowing the fluid to flow forthwith constitutes a heat carrier for heat accumulation to replace the heat equalizer 102, made of a material with good heat conduction performance; or both of the heat equalizer 102 and the space in the natural heat carrier 101 are provided at the same time;

an installation 103: relates to an industrial installation given specific functions including precision tooling machine, precision industrial machine, precision test/detection instrument, observation instrument that requires stable temperature; or specific open storage tank, closed storage tank or any other cold storage facilities and power storage device such as UPS battery that must operate in an environment of consistent temperature; or rotary electro-mechanical equipment including engine of an internal combustor, motor, or generator that must be cooled during operation; the installation 103 including any of those installations, facilities, or devices is constructed such that it is prepared to execute the subject matter of temperature equalization; or is adapted with a heat sink for cooling or heating to function as the subject matter of temperature equalization; inside the installation 103, a duct is provided for the fluid 104 to pass through, and a construction is provided at where the structure of the subject matter of temperature equalization attempted by the installation 103 to regulate for temperature equalization between the fluid 104 and the installation 103; or the duct allowing circulation of the fluid 104 is forthwith used to directly provide the regulation for temperature equalization by passing the location of the subject matter of temperature equalization regulating desired. Furthermore, optional items including a bypass duct 119, a bypass control valve 120, and a bypass auxiliary pump 121 may be provided as applicable to introduce the fluid 104 from the heat equalizer 102 disposed in the natural heat carrier 101 to regulate for temperature equalization by having the fluid 104 to flow through the selected individual part of the installation 103, and then the fluid 104 flows back to the heat equalizer 102 to complete the circulation for the operation to provide temperature equalization;

the fluid 104: relates to a gas or a liquid provided to execute the function of heat transmission in the system; the fluid 104 is pumped by the pump 106 to flow through the heat equalizer 102 disposed in the natural heat carrier 101, the fluid transmission duct 105, the optional bypass duct 119 disposed in the installation 103, and flow back through the fluid transmission duct 105 to the heat equalizer 102 to complete the circulation for the operation to provide temperature equalization;

the fluid transmission duct 105: relates a duct structure provided at where between the heat equalizer 102 and the installation 103 and connected in series with the pump 106 for the fluid 104 to circulate; to facilitate maintenance, an optional device with structure to open or to draw may be provided to the fluid transmission duct 105 as applicable;

the pump 106: relates to a fluid pump driven by electric power, mechanical force, manpower, or any other natural force, connected in series with the fluid transmission duct 105, and subject to the control by a control unit 110 to pump the fluid 104; this pumping function may be submitted by the convection effects of the temperature fluctuation of the fluid;

the temperature detector device 107: an optional item related to analog or digital dynamo-electric or solid state electronic device of the prior art to indicate the temperature, or provide signal feedback to the control unit 110;

a filter 108: relates to an optional item provided at the fluid suction inlet or outlet of each device mounted to the fluid circulation loop, or at a selected location in the fluid transmission duct 105 to prevent the duct from getting plugged and assurance of clean fluid;

the auxiliary temperature regulation device 109: an optional item related to dynamo-electric solid, gas or liquid state temperature regulation device to heat or cool the fluid 104, or a power heating or cooling device comprised of solid state or semiconductor, provided in the installation adapted with the temperature equalization system of the present invention at where to heat or cool the fluid 104; and as subject to the control by the control unit 110 to be activated to regulate the heating or cooling temperature control to the fluid 104 when the temperature in the device floats away from the range set; and the control unit 110: comprised of dynamo-electric or solid state electronic circuit and related software to control the direction and flow rate of the fluid 104 between the heat equalizer 102 and the installation 103; and to control the pump 106 to pump the fluid 104 for executing periodically positive and negative exchange of the flowing direction of the fluid 104; the operation methods include continuous pumping and intermittent pumping; and control the following operations:

the pump 106 subject to the control by the control unit 110 periodically pumps the fluid 104 in both positive and negative directions for the fluid 104 flowing through the heat equalizer 102, the fluid transmission duct 105 and the interior of the installation 103 to execute periodical exchange of the flowing direction; and for the fluid 104 passing through the heat equalizer 102 and the inlet and outlet of the installation 103 to provide better results of temperature equalization due to periodical exchange of the flowing direction, thus to constitute two-way regulation and control of temperature equalization; and when the auxiliary temperature regulation device 109, liquid bypass duct 119, bypass control valve 120, and bypass auxiliary pump 121 are optionally provided to the installation 103, the control unit 110 controls the operating timing and temperature setup of the auxiliary temperature regulation device 109, and controls the operation of the bypass control valve 120 and the bypass auxiliary pump 121 to pump or stop pumping the fluid 104 in each bypass duct 119, and controls the flow rate or any other related functions; and the control unit 110 could be setup functions and may be or may not be provided as applicable. FIG. 4 is a schematic view showing a system of the present invention to indirectly provide temperature equalization by means of a two-way fluid. Wherein, the additional relay heat equalizer 202 is provided to indirectly transmit thermal energy for constituting a two-way indirect regulation system of temperature equalization. Other than those items including the natural heat carrier 101, the heat equalizer 102, the installation 103, the fluid 104, the fluid transmission duct 105, the pump 106, the temperature detection device 107, the filter 108, the control unit 110, and those optional items including the auxiliary temperature regulation device 109, the bypass duct 119, the bypass control valve 120, and the bypass auxiliary pump 121, as illustrated in FIG. 3, this system indirectly executing regulation of temperature equalization by means of the two-way fluid further includes:

one or a plurality of the heat equalizer 102 with good heat conduction performance is disposed in the natural heat carrier 101 for both of the heat equalizer 102 and the natural heat carrier 101 to jointly provide the conduction of heat equalization;

the relay heat equalizer 202 is made of a material giving good heat accumulation and heat conduction properties, and provided with a first fluid passage including inlet, flowing passage, and outlet for the fluid 104 and a second fluid passage including inlet, flowing passage, and outlet for another fluid 204; both of the fluid 104 and the fluid 204 transmit thermal energy to each other by means of the relay heat equalizer 202;

the fluid transmission duct 205 and a fluid relay pump 206 are provided at where between the heat equalizer 102 and the relay heat equalizer 202 to continuously or intermittently execute periodically positive and negative pumping the fluid 204 between the heat equalizer 102 and the relay heat equalizer 202 to form a closed loop flow passage for functioning the regulation of temperature equalization between the heat equalizer 102 and the relay heat equalizer 202;

the fluid transmission duct 105 and the pump 106 are disposed between the installation 103 and the relay heat equalizer 202 to continuously or intermittently execute periodically positive and negative pumping of the fluid 104 between the installation 103 and the relay heat equalizer 202 to provide the function of regulating the temperature equalization;

the fluid transmission duct 105: relates to a duct structure provided for the fluid 104 to circulate; to facilitate maintenance, an optional device with structure to open or to draw may be provided to the fluid transmission duct 105 as applicable;

the fluid 104: relates to a gas or liquid giving good heat accumulation and heat conduction properties, and is pumped by the pump 106 for the fluid 104 between the relay heat equalizer 202 and the installation 103 to constitute a flow passage through the fluid transmission duct 105 to provide the regulating function of heat equalization; and the fluid 104 may be or may not be identical with the fluid 204 as applicable;

the fluid transmission duct 205: relates to a duct structure for the fluid 204 to pass through, to facilitate maintenance, an optional device with structure to open or to draw may be provided to the fluid transmission duct 205 as applicable;

the fluid 204: relates to a gas or liquid giving good heat accumulation and heat conduction properties, and is pumped by the relay pump 206 for the fluid 204 between the heat equalizer 102 and the relay heat equalizer 202 to constitute a flow passage through the fluid transmission duct 205 to provide the regulating function of heat equalization; and the fluid 204 may be or may not be identical with the fluid 104 as applicable;

the pump 106: relates to a fluid pump driven by electric power, mechanical force, manpower, or any other natural force, connected in series with the fluid transmission duct 105, and subject to the control by a control unit 110 to pump the fluid 104; this pumping function may be submitted by the convection effects of the temperature fluctuation of the fluid;

the relay pump 206: relates to a fluid pump driven by electric power or mechanical force to pump the fluid 204; and this pumping function may be submitted by the convection effects of the temperature fluctuation of the fluid;

the control unit 110: comprised of dynamo-electric or solid state electronic circuit and related software to control the direction and flow rate of the fluid 104 between the installation 103 and the relay heat equalizer 202 and the flowing direction and flow rate of the fluid 204 between the relay heat equalizer 202 and the heat equalizer 102; and to control the pump 106 to pump the fluid 104 or to control the relay pump 206 to pump the fluid 204 for executing periodically positive and negative exchange of the flowing direction of the fluid 104 or the flowing direction of the fluid 204; the operation methods include continuous pumping and intermittent pumping; and control the following operations:

the pump 106 subject to the control by the control unit 110 periodically pumps the fluid 104 in both positive and negative directions for the fluid 104 flowing through the relay heat equalizer 202, the fluid transmission duct 105 and the interior of the installation 103 to execute periodical exchange of the flowing direction; and for the fluid 104 passing through the relay heat equalizer 202 and the inlet and outlet of the installation 103 to provide better results of temperature equalization due to periodical exchange of the flowing direction, thus to constitute two-way regulation and control of temperature equalization; and the relay pump 206 subject to the control by the control unit 110 periodically pumps the fluid 204 in both positive and negative directions for the fluid 204 flowing through the heat equalizer 102, the fluid transmission duct 205 and the interior of relay heat equalizer 202 to execute periodical exchange of the flowing direction; and for the fluid 204 passing through the relay heat equalizer 202 and the inlet and outlet of the heat equalizer 102 to provide better results of temperature equalization due to periodical exchange of the flowing direction, thus to constitute two-way regulation and control of temperature equalization; and when the auxiliary temperature regulation device 109, bypass duct 119, by pass control valve 120, and bypass auxiliary pump 121 are optionally provided to the installation 103, the control unit 110 controls the operating timing and temperature setup of the auxiliary temperature regulation device 109, and controls the operation of the bypass control valve 120 and the bypass auxiliary pump 121 to pump or stop pumping the fluid 104 in each bypass duct 119, and controls the flow rate or any other related functions; and the control unit 110 could be setup functions and may be or may not be provided as applicable. For the system illustrated in FIG. 1 showing the operation of heat equalization between the heat equalizer 102 and the installation 103, one or a plurality of fluid transmission duct 105 and one or a plurality of the pump 106 are disposed at where between the heat equalizer 102 and the installation 103 to constitute a closed loop of flow passage; and having the pump 106 to pump the fluid 104 giving good heat conduction performance to execute one-way continuous or intermittent pumping or control and regulate the pumped flow rate of the fluid 104 to provide the function of temperature equalization between the heat equalizer 102 and the installation 103.

The operation of heat equalization between the heat equalizer 102 and the installation 103 of the system as illustrated in FIG. 3 is achieved by having provided the fluid transmission duct 105 that admits the flow of the fluid 104 and the pump 106, and having the pump 106 to pump the fluid 104 to execute continuous or intermittent pumping in a flowing direction of periodical exchange thus to equalize the temperature difference between the heat equalizer 102 and the installation 103.

The system illustrated in FIG. 1 and FIG. 3 may directly have a heat pipe giving good heat conduction of the prior art provided at where between the heat equalizer 102 and the installation 103 to replace the fluid transmission duct 105, or replace the optional bypass duct 119 to provide the function of temperature equalization.

In the operation method of heat equalization between the heat equalizer 102 and the relay heat equalizer 202 of the system as illustrated in FIG. 2, one or a plurality of fluid transmission duct 205 and one or a plurality of the relay pump 206 are disposed at where between the heat equalizer 102 and the relay heat equalizer 202 to constitute a closed loop of flow passage; and having the relay pump 206 to pump the fluid 204 giving good heat conduction performance to execute one-way continuous or intermittent pumping or control and regulate the pumped flow rate of the fluid 204 to provide the function of temperature equalization between the heat equalizer 102 and the relay heat equalizer 202.

The operation of heat equalization between the relay heat equalizer 202 and the installation 103 of the system as illustrated in FIG. 2 is achieved by having provided one of a plurality of the fluid transmission duct 105 and one of a plurality of the pump 106 deposed at where between the relay heat equalizer 202 and the installation 103 to constitute a closed loop of flow passage and having the pump 106 to pump the fluid 104 giving good heat conduction performance to execute one-way continuous or intermittent pumping or to control and regulate the pumped flow rate of the fluid 104, thus to equalize the temperature difference between the relay heat equalizer 202 and the installation 103.

In the operation method of heat equalization between the heat equalizer 102 and the relay heat equalizer 202 of the system as illustrated in FIG. 4, the fluid transmission duct 205 that admits the flow of the fluid 204 and the relay pump 206 are disposed at where between one or a plurality of relay heat equalizer 202 and one or a plurality of heat equalizer 102; and having the relay pump 206 to pump the fluid 204 giving good heat conduction performance to execute continuous or intermittent pumping in a flowing direction of periodical exchange to provide the function of temperature equalization between the heat equalizer 102 and the relay heat equalizer 202.

The operation of heat equalization between the relay heat equalizer 202 and the installation 103 of the system as illustrated in FIG. 4 is achieved by having provided the fluid transmission duct 105 that admits the flow of the fluid 104 and the pump 106 at where between the relay heat equalizer 202 and the installation 103, and having the pump 106 to pump the fluid 104 to execute continuous or intermittent pumping in a flowing direction of periodical exchange thus to equalize the temperature difference between the relay heat equalizer 202 and the installation 103.

The system illustrated in FIG. 2 and FIG. 4 may directly have a heat pipe giving good heat conduction of the prior art provided at where between the heat equalizer 102 and the relay heat equalizer 202 to replace the fluid transmission duct 205, or provided at where between the relay heat equalizer 202 and the installation 103 to replace the fluid transmission duct 105 or replace the optional bypass duct 119 to provide the function of temperature equalization.

The relay pump 206 disposed between the heat equalizer 102 and the relay heat equalizer 202 to pump the fluid 204, and the pump 106 disposed between the relay heat equalizer 202 and the installation 103 to pump the fluid 104 as illustrated in FIG. 2, FIG. 4 and described above may take place at the same time or not in executing periodical change of the two-way flow pumping; or either of the pump 106 and the relay pump 206 may be selected to execute one-way continuous or intermittent pumping while the other pump executes the continuous or intermittent pumping for periodical change of the flow direction.

(1) In general, the pump 106 or the relay pump 206 described above and illustrated in FIGS. 1, 2, 3, and 4 may be made any of the following modes: Only one pump executes one-way continuous pumping;

(2) Only one pump executes one-way intermittent pumping;

(3) Only one pump executes one-way pumping to periodically change the flow direction of the fluid pumped through the control by a valve allowing variable flow direction;

(4) Multiple pumps with different power sources execute pumping in different directions at the same time, or separately execute pumping in periodically changed flow direction of the fluid pumped;

(5) Multiple pumps in different flow directions are driven at the same time by the same power source to execute continuous pumping in different flow directions, or to further execute periodical change of the flow direction of the fluid pumped; or (6) A two-way pump capable of alternatively executing pumping directions is used to periodically change the flow direction of the fluid pumped by changing the revolving direction of the power source.

The fluid transmission duct 105, or the fluid transmission duct 205, or the optional bypass duct 119 as described above and as illustrated in FIGS. 1, 2, 3, and 4 is made of a material giving good heat accumulation property and in construction depending on the length needed and the specific geometric form, e.g., the duct may be made in curvature, labyrinth, or vortex form, and buried in the natural heat carrier 101 to replace or support the heat equalizer 102 in achieving heat equalization between the heat equalizer 102 and the natural heat carrier 101.

The installation adapted with the system to provide temperature equalization by means of the natural heat carrier described above and illustrated in FIGS. 1, 2, 3, and 4 may be further provided with the following auxiliary control devices as applicable:

a filter: to be mounted to the inlet or the outlet of the fluid of each item or in the fluid transmission duct of the system to prevent the duct from being plugged and to clean the fluid; the filter may be comprised of a strainer or any other filtering device of the prior art and the filter relates to an optional item to be provided as applicable; and a flow rate regulation valve: relates to a valve for controlling the flow rate of the fluid by manual, mechanical force, fluid force, or electro-magnetic force and the valve is also related to an optional item to be provided as applicable.

Those items including the heat equalizer 102, the installation 103, the fluid 104, the fluid transmission duct 105, the pump 106, and those optional items including temperature detection device 107, the filter 108, the auxiliary temperature regulation device 109, the control unit 110, the fluid bypass duct 119, the bypass control valve 120, and the bypass auxiliary pump 121 in the system as described above and illustrated in FIGS. 1, and 3 may be provided in only one unit or in multiple units. When multiple units are provided for each item, the specification or the material may vary as applicable.

Those items including the heat equalizer 102, the installation 103, the fluid 104, the fluid transmission duct 105, the pump 106, the relay heat equalizer 202, another fluid 204, the relay pump 206, and those optional items including temperature detection device 107, the filter 108, the auxiliary temperature regulation device 109, the control unit 110, the fluid bypass duct 119, the bypass control valve 120, and the bypass auxiliary pump 121 in the system as described above and illustrated in FIGS. 2, and 4 may be provided in only one unit or in multiple units. When multiple units are provided for each item, the specification or the material may vary as applicable.

The installation adapted with a temperature equalization system by means of a natural heat carrier of the present invention by operating on the long-term reliable thermal energy from heat carriers in the nature with the fluid 104 flowing through the heat equalizer 102 mounted in the natural heat carrier to carry the thermal energy to achieve the purpose of heat equalization as the fluid 104 flows through the installation 103 requires less energy source in the temperature regulation and control than that by the conventional air conditioning system.

What is claimed is:

1. A temperature equalization system, comprising:
an installation;
a heat equalizer disposed in a natural heat carrier, and being made of a material of heat conduction to conduct heat with the natural heat carrier;
a relay heat equalizer made of a material of heat conduction;
a first fluid transmission duct disposed between the relay heat equalizer and the installation, and having a first fluid contained therein for heat transmission;
a second fluid transmission duct disposed between the heat equalizer and the relay heat equalizer, and having a second fluid contained therein for heat transmission;
a pump (106) connected in series with the first fluid transmission duct for pumping the first fluid;
a relay pump (206) connected in series with the second fluid transmission duct for pumping the second fluid;
first and second fluid bypass ducts disposed in parallel in the installation and both in communication with the first fluid transmission duct, the first and second fluid bypass ducts respectively having first and second bypass control valves connected in series therewith, only the second fluid bypass duct having a bypass auxiliary pump connected in series therewith for pumping the first fluid flowing therethough; and
a control means controlling an operation of temperature equalization system, the control means
controlling the pump (106) to pump the first fluid, to thereby circulate the first fluid through the relay heat equalizer, the first fluid transmission duct and an interior of the installation,
controlling the relay pump (206) to pump the second fluid, to thereby circulate the second fluid through the relay heat equalizer, the second fluid transmission duct and the heat equalizer; and controlling the first and second bypass control valves to thereby control flow rates of the first fluid respectively flowing through the first and second fluid bypass ducts, and controlling pumping of the bypass auxiliary pump.

2. The temperature equalization system of claim 1, further comprising an auxiliary temperature regulation device that heats or cools the first fluid under control of the control means.

3. The temperature equalization system of claim 1, wherein the pump (106), under control of the control means, pumps the fluid continuously or intermittently to equalize a temperature difference between the relay heat equalizer and the installation.

4. The temperature equalization system of claim 1, wherein the relay pump (206), under control of the control means, pumps the fluid continuously or intermittently to equalize a temperature difference between the heat equalizer and the relay heat equalizer.

5. The temperature equalization system of claim 1, wherein the pump (106) includes a plurality of pumps, each with a same or a different power source.

6. The temperature equalization system of claim 1, wherein the pump (106) includes a plurality of pumps connected to a single power source.

7. The temperature equalization system of claim 1, wherein the relay pump (206) includes a plurality of pumps, each with a same or a different power source.

8. The temperature equalization system of claim 1, wherein the relay pump (206) includes a plurality of pumps connected to a single power source.

9. The temperature equalization system of claim 1, further comprising a filter mounted in at least one of a first fluid circulation passage including the installation, the relay heat equalizer, the first fluid transmission duct and the pump (106), and a second fluid circulation passage including the heat equalizer, the relay heat equalizer, the second fluid transmission duct, and the relay pump (206), for cleaning the first or second fluid flowing therethrough.

10. The temperature equalization system of claim 1, further comprising a flow rate regulation valve for controlling a flow rate of the first fluid.

11. The temperature equalization system of claim 1, further comprising a flow rate regulation valve for controlling a flow rate of the second fluid.

12. The temperature equalization system of claim 1, wherein at least one of the heat equalizer, the relay heat equalizer, the installation, the first and second fluid transmission ducts, the pump (106), the relay pump (206) and the control means is of a plurality of units.

13. The temperature equalization system of claim 12, wherein the plurality of units are of a same or not of a same material and specification.

* * * * *